(12) United States Patent
Lasher et al.

(10) Patent No.: US 10,104,870 B2
(45) Date of Patent: Oct. 23, 2018

(54) SYSTEM FOR IDENTIFYING A LOST/STRAY ANIMAL FROM A SAFE DISTANCE AND NOTIFYING THE OWNER IF DESIRED

(71) Applicants: Daniel J. Lasher, Lorena, TX (US); Daniel W. Lasher, Charlotte, NC (US)

(72) Inventors: Daniel J. Lasher, Lorena, TX (US); Daniel W. Lasher, Charlotte, NC (US)

( * ) Notice: Subject to any disclaimer, the term of this patent is extended or adjusted under 35 U.S.C. 154(b) by 0 days.

(21) Appl. No.: 15/666,419

(22) Filed: Aug. 1, 2017

(65) Prior Publication Data

US 2018/0035640 A1  Feb. 8, 2018

Related U.S. Application Data

(60) Provisional application No. 62/371,350, filed on Aug. 5, 2016, provisional application No. 62/447,467, filed on Jan. 18, 2017.

(51) Int. Cl.
| | |
|---|---|
| *G06F 17/00* | (2006.01) |
| *A01K 11/00* | (2006.01) |
| *G06K 19/14* | (2006.01) |
| *G06K 7/10* | (2006.01) |

(52) U.S. Cl.
CPC ........ *A01K 11/008* (2013.01); *G06K 7/10297* (2013.01); *G06K 19/14* (2013.01)

(58) Field of Classification Search
CPC ....... G06Q 30/02; G07F 7/1008; G06K 17/00
USPC ......................................................... 235/375
See application file for complete search history.

(56) References Cited

U.S. PATENT DOCUMENTS

| | | | | |
|---|---|---|---|---|
| 9,298,756 | B1 * | 3/2016 | Johnson | ............ G06F 17/30879 |
| 2003/0067386 | A1 * | 4/2003 | Skinner | ................ G08B 25/006 340/540 |
| 2003/0229452 | A1 * | 12/2003 | Lewis | .................... G06F 19/322 702/19 |
| 2015/0334994 | A1 * | 11/2015 | Prasad | ................. A01K 11/008 340/539.32 |

* cited by examiner

*Primary Examiner* — Ahshik Kim
(74) *Attorney, Agent, or Firm* — Weiss & Moy, P.C.; Jeffrey D. Moy (57) ABSTRACT

A method of identifying and assisting an animal comprises: transmitting a unique identification and serial number from an identification tag coupled to the animal to a first portable electronic device; inputting owner information from the first portable electronic device; receiving the unique identification and serial number from an identification tag by a second electronic device; and receiving the owner information on the second portable electronic device.

12 Claims, 10 Drawing Sheets

ND NOTIFYING THE OWNER IF DESIRED

RELATED APPLICATIONS

This patent application is related to U.S. Provisional Application No. 62/371,350 filed Aug. 5, 2016, entitled "System For Identifying Owner of Pet From A Safe Distance" in the name of the same inventors, and U.S. Provisional Application No. 62/447,467 filed Jan. 18, 2017, entitled "System For Identifying A Lost/Stray Animal From A Safe Distance and Notifying The Owner" in the name of the same inventors, both of which are incorporated herein by reference in its entirety. The present patent application claims the benefit under 35 U.S.C § 119(e).

TECHNICAL FIELD

The present application relates generally to the technical field of owned animals, and more specifically, to the technical field of utilizing electronic transmission devices for identifying a lost/stray animal from a safe distance and notifying the owner with details of when and where the animal was seen while remaining anonymous if desired.

BACKGROUND

Owners of pets are always faced with the possibility of losing their animals. In an attempt to assure safe return of a lost pet, owners have placed their names, phone numbers and/or addresses on the pet tags worn by the pet, in hopes that the finder of the lost pet will contact the owner if the pet is found. If a pet is lost, this provides some direction and incentive to the finder of a pet to contact the rightful owner and safely return the animal.

Another method used by pet owners is through the use of computer microchips. The microchips may be programmed to contain identification information. One example of these microchip devices may be passive radio-frequency identification, hereafter RFID capsules. These RFID capsules have been provided to shelters, veterinarians, and pet hospitals in the form of miniature capsules that are injected into an animal via syringe and described in U.S. Pat. No. 5,025,550 assign to Trovan Limited. This works by injecting a fully assembled transponder that is encapsulated in the microchip into the animal's body. Millions of pets currently have the RFID transponder microchips injected into them using this method representing a socially acceptable method to help identify pets and their owners.

For identification to be retrieved from the microchip a person using a specific RFID reader has to be in very close proximity of the animal, typically holding the animal, to read a unique identifiable code that is wirelessly transmitted from the chip to the reader using the scanner as the power source to trigger and read the powerless passive RFID chip signal. The disadvantage of this process is it requires specific costly RFID microchip readers for different microchips since not all microchip readers read all microchips, and the scanner has to be within inches of the pet to be within range of the passive RFID in order to trigger a signal return.

In the event of a scared or injured lost animal, the animal may not allow anyone to approach or may attack the person concerned for the pet's well-being. Contacting local animal control and having them respond can take a significant amount of time, sometimes hours, which could be critical to the animal's wellbeing.

Therefore, it would be desirable to provide a system and method that overcomes the above. The system and method would allow individuals to identify a lost/stray animal from a safe distance and notifying the owner with details of when and where the animal was seen while remaining anonymous if desired.

SUMMARY

In accordance with one embodiment, a method of identifying and assisting an animal is disclosed. The method comprises: transmitting a unique identification and serial number from an identification tag coupled to the animal to a first portable electronic device; inputting owner information from the first portable electronic device; receiving the unique identification and serial number from an identification tag by a second electronic device; and receiving the owner information on the second portable electronic device.

In accordance with one embodiment, a method of identifying and assisting an animal is disclosed. The method comprising: transmitting a Bluetooth beacon transmission signal containing a unique identification and serial number from an identification tag coupled to the animal to a first portable electronic device; inputting owner information from the first portable electronic device; transmitting the owner information inputted from the first portable electronic device to a server; storing the owner information on the server; receiving the unique identification and serial number from an identification tag by a second portable electronic device; and receiving the owner information on the second portable electronic device from the server.

BRIEF DESCRIPTION OF THE DRAWINGS

The present application is further detailed with respect to the following drawings. These figures are not intended to limit the scope of the present application but rather illustrate certain attributes thereof. The same reference numbers will be used throughout the drawings to refer to the same or like parts.

DESCRIPTION OF THE APPLICATION

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Embodiments of the exemplary system and method disclose a pet identification tag utilizing a Bluetooth low energy (BLE) beacon function, a handheld device configured to wirelessly receive data from the pet identification tag, and software on the handheld device configured to facilitate identification of a lost/stray animal. The system and method may alert and notify the animal's owner that the animal has been located and provide global positioning system coordinates, allow communication between the animal's owners and a third party who located the lost/stray animal, allow for the owner to identify the animal as lost, allow for alerting participating third parties that a lost animal is in close proximity to their persons', while utilizing Bluetooth communications, Global Positioning System communications, Global System for Mobile communications, Wi-Fi communications, computer network communications, and/or additional IEEE standards.

Figure 1:
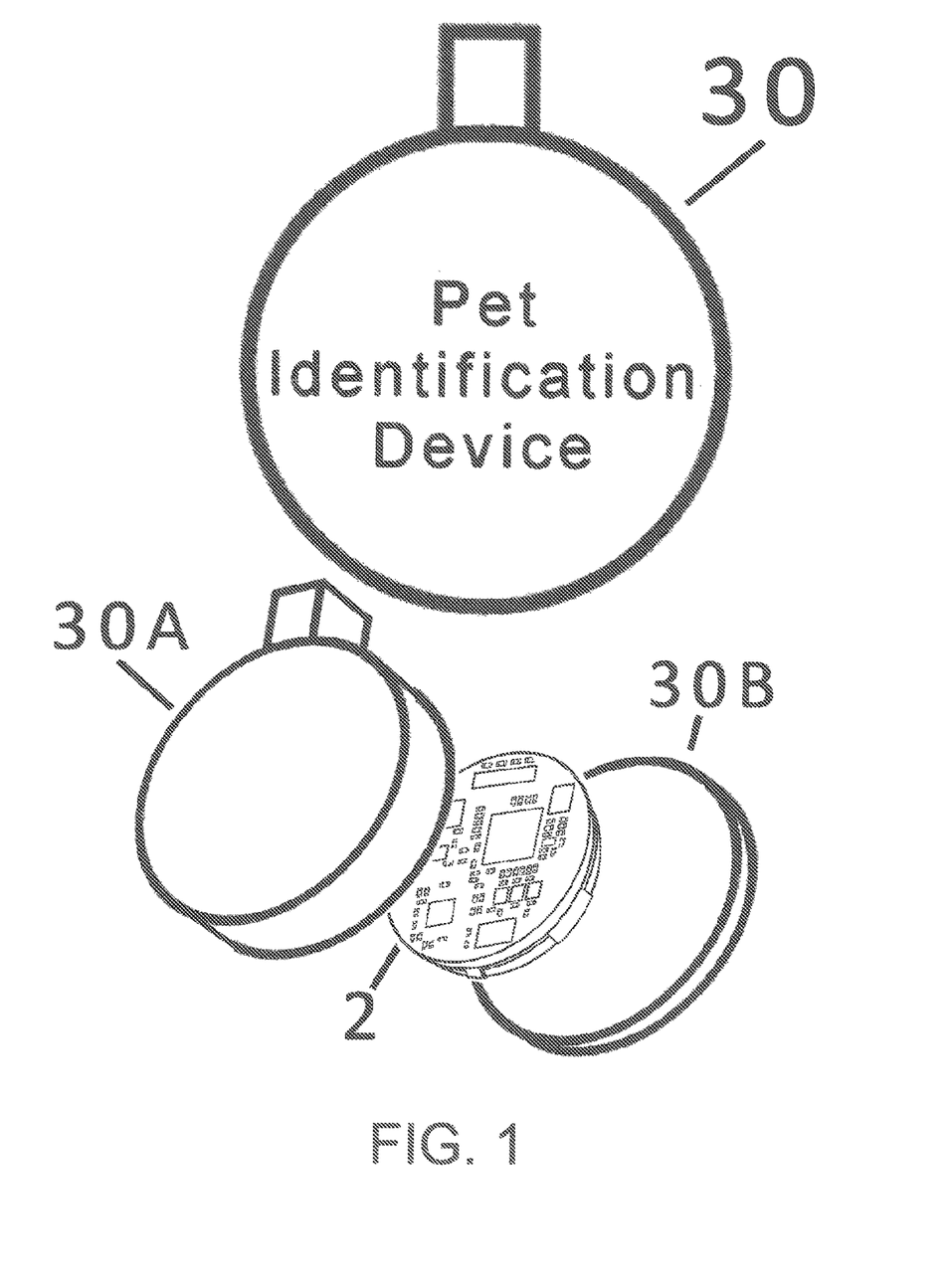
FIG. 1 is a perspective view of the Pet-animal Identification Device (PID) assembly containing a Bluetooth beacon circuit board with an attached power supply within a water resistant plastic or rubber containment device in accordance with an embodiment of the present invention.

Referring to FIG. 1, a Pet-animal Identification Device (PID) assembly 30 may be seen. The PID assembly 30 may be comprised of a housing 31. While the housing 31 shown in FIG. 1 is cylindrical in shape, this is shown as an example and should not be seen in a limiting manner. The housing 31 may be formed in other geometrical configurations.

In the present embodiment, the housing 31 may be formed of a front section 30A and back section 30B. The front section 30A may be configured to hold and store a communication tag and power supply 2. The back section 30B may be used to cover an open end of the front section 30A thereby forming a closed housing 31. In accordance with one embodiment, the housing 31 may be a watertight and/or water resistance assembly. The housing 31 may be formed of a lightweight but sturdy material such as plastic or similar material.

The communication tag and power supply 2 may be programmed with an identification and serial number. The identification and serial number may be unique for each communication tag and power supply 2 and cannot be reprogrammable by the pet owner. The communication tag and power supply 2 may have a programmable area which may allow a pet owner to enter and store information about the pet such as the pet's name, microchip number, photo, veterinarian, and/or additional information provided by the pet owner. In accordance with one embodiment, the communication tag and power supply 2 may be a Bluetooth low energy beacon device. Since the communication tag and power supply 2 may be a Bluetooth low energy beacon device, any Bluetooth enabled mobile device equipped having software to securely connect to the PID assembly 30 may be able to wirelessly transmit and/or receive data information from the PID assembly 30.

Figure 2:
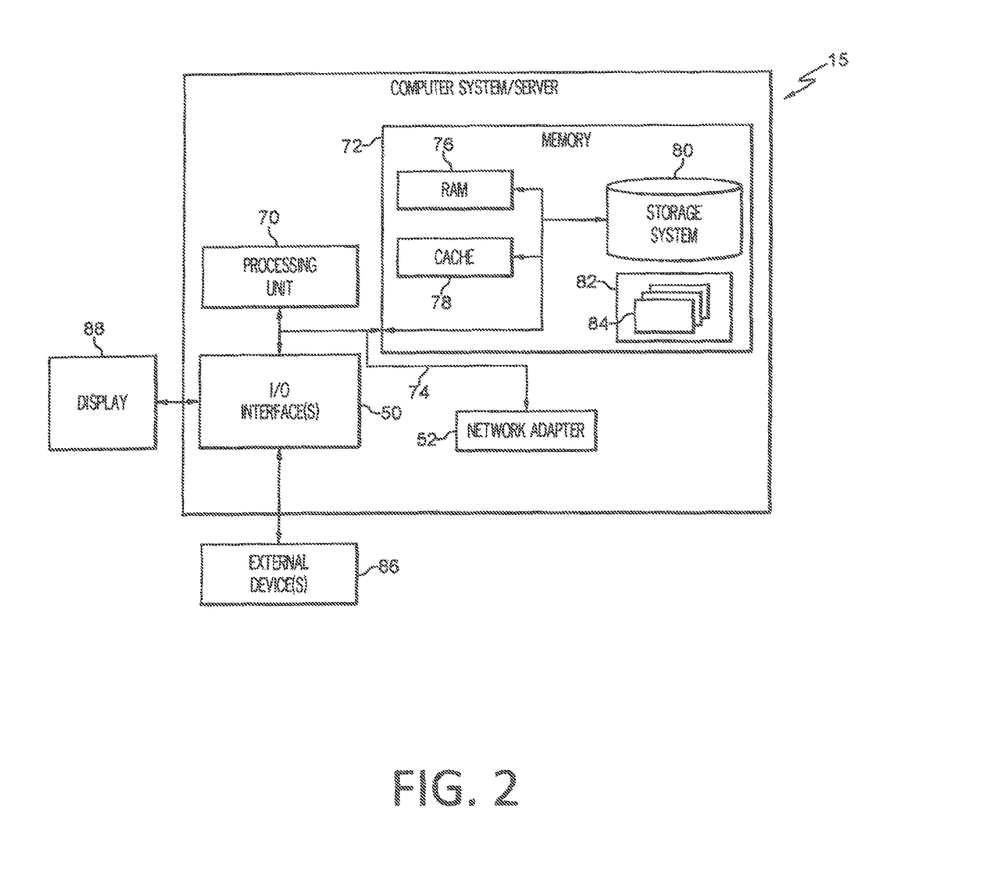
FIG. 2 is a block diagram of a handheld device in accordance with one embodiment of the present invention.

Referring to FIG. 2, the system and method of the present invention may utilize a mobile device 15. The mobile device 15 may be mobile phones, tablets, and other similar devices. In accordance with one embodiment, the mobile device 15 may be a Bluetooth enabled mobile device.

The mobile device 15 may be described in more detail in terms of the machine elements that provide functionality to the systems and methods disclosed herein. The components of the mobile device 15 may include, but are not limited to, one or more processors or processing units 70, a system memory 72, and a system bus 74 that couples various system components including the system memory 72 to the processor 70. The mobile device 15 may typically include a variety of computer system readable media. Such media could be chosen from any available media that is accessible by the mobile device 15, including non-transitory, volatile and non-volatile media, removable and non-removable media. The system memory 72 could include one or more computer system readable media in the form of volatile memory, such as a random access memory (RAM) 76 and/or a cache memory 78. By way of example only, a storage system 80 may be provided for reading from and writing to a non-removable, non-volatile magnetic media device typically called a "hard drive".

The system memory 72 may include at least one program product/utility 82 having a set (e.g., at least one) of program modules 84 that may be configured to carry out the functions of embodiments of the invention. The program modules 84 may include, but is not limited to, an operating system, one or more application programs, other program modules, and program data. Each of the operating systems, one or more application programs, other program modules, and program data or some combination thereof, may include an implementation of a networking environment. The program modules 84 generally carry out the functions and/or methodologies of embodiments of the invention as described herein. For example, the program modules 84 may carry out the steps to facilitate identification of a lost/stray animal, alert and/or notify the animal's owner that the animal has been located and providing the global positioning system coordinates, provide a mechanism to communication between the animal's owners and a third party who located the lost/stray animal, as well as other functionality as will be described below.

Figure 6:
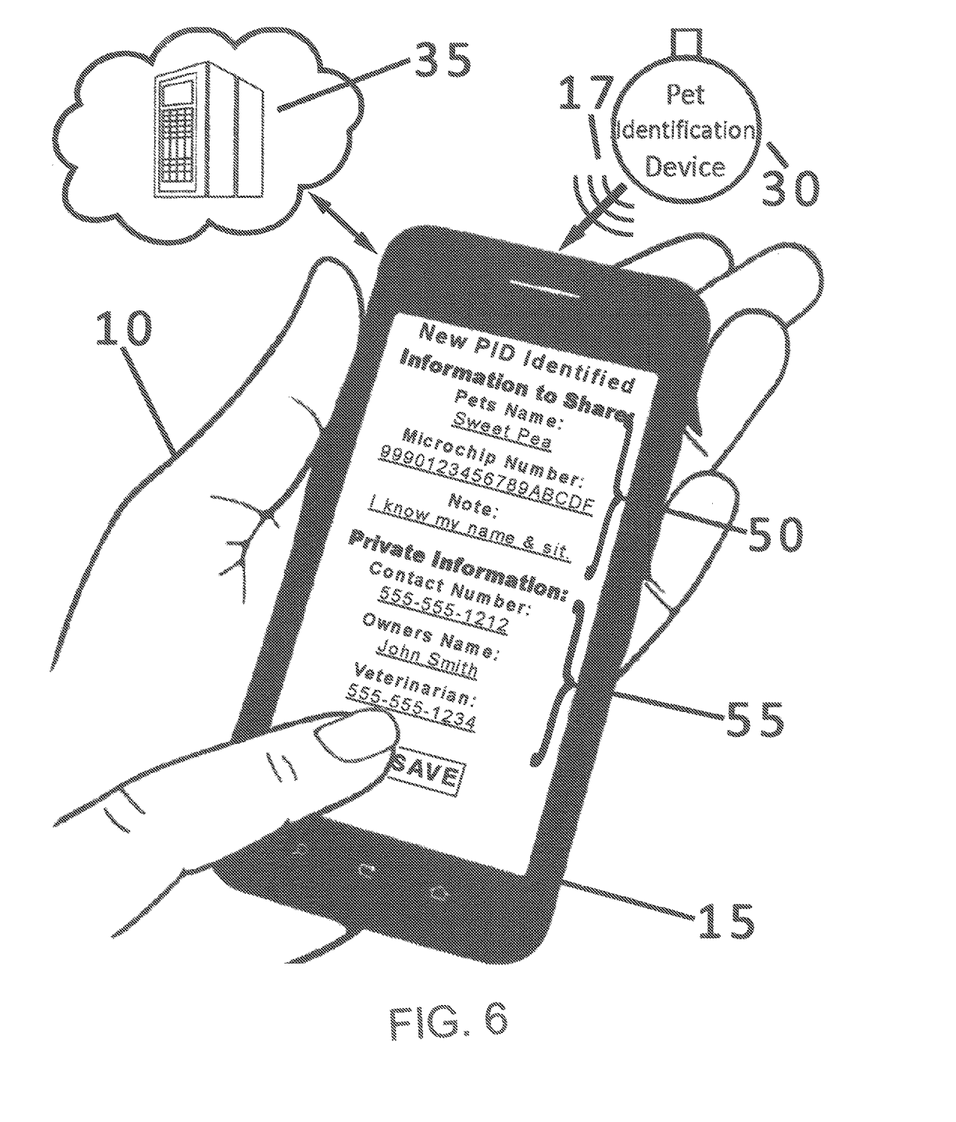
FIG. 6 is a perspective view of the owner utilizing a mobile device with the software applications to receive the beacon data information transmission from the PID and inputting non-confidential animal information and confidential owner's information that is sent to and saved upon the system server in accordance with one embodiment of the present invention.

The mobile device 15 may communicate with one or more external devices 86 such as a keyboard, a pointing device, a display 88, and/or any similar devices that enable the mobile device 15 to communicate with a server 35 (FIG. 6). The mobile device 15 may communicate with one or more networks such as a local area network (LAN), a general wide area network (WAN), and/or a public network.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon.

Any combination of one or more computer readable media (for example, storage system 80) may be utilized. In the context of this disclosure, a computer readable storage medium may be any tangible or non-transitory medium that can contain, or store a program (for example, the program product 82) for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

Figure 3:
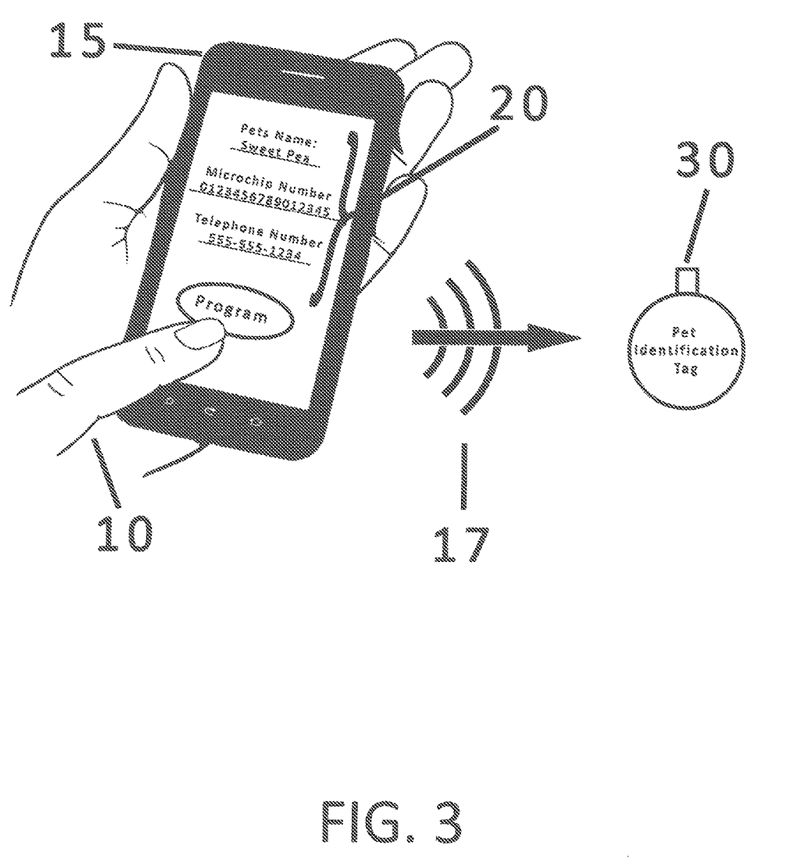
FIG. 3 is a perspective view of the input of the handheld device and pet identification device in accordance with one embodiment of the present invention.

Referring to FIG. 3, in accordance with one embodiment, when a pet owner 10 receives a PID assembly 30, the pet owner 10 may first activate the PID assembly 30. Activation may be done in different manners such as turning on a switch, connecting a power supply and similar methods. The pet owner 10 may download/install the app on the mobile device 15 and/or computer having Bluetooth capabilities (hereinafter mobile device 15). The pet owner 10 may open the app on the mobile device 15. An information page may be displayed on the mobile device 15. The information page may allow the pet owner to enter information to be programmed into the PID assembly 30. The pet owner 10 may enter information 20 onto the information page via the mobile device 15. As stated above, PID assembly 30 may contains a unique identifier that is not reprogrammable by the pet owner 10. The pet owner 10 may enter information about the pet such as the pet's name, microchip number, photo, veterinarian, and/or additional information provided by the pet owner 10. This information may be transmitted wirelessly 17 to the PID assembly 30 that receives and stores the data internally. The pet owner 10 may update this information on the PID assembly 30 when necessary.

Figure 4:
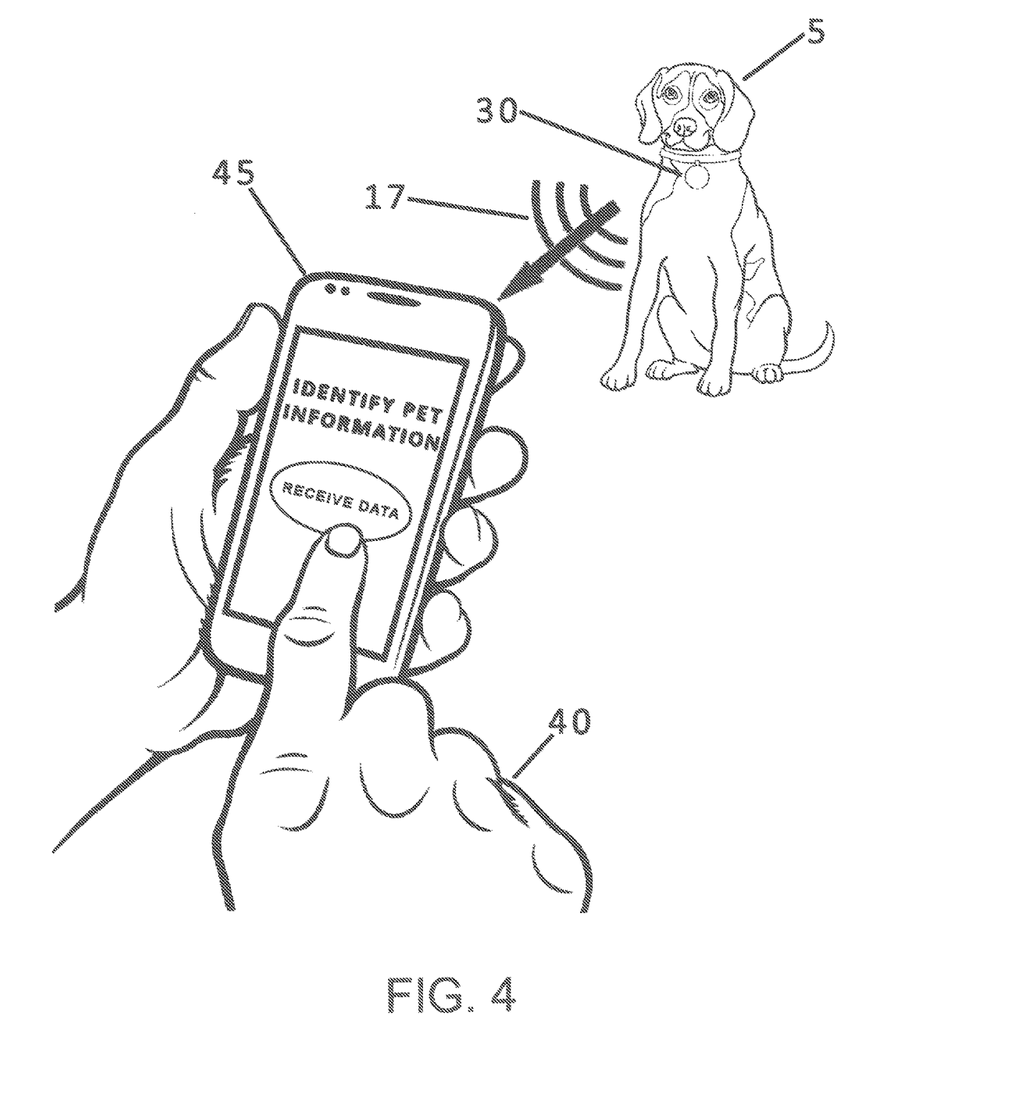
FIG. 4 is a perspective view of a found pet with a third party using a hand held device to identify the pet in accordance with one embodiment of the present invention.

Referring to FIG. 4, once the PID assembly 30 is programmed, the PID assembly 30 may be attached to a collar of a pet 5. In the event the pet 5 becomes lost and a concerned person 40 becomes involved in assisting the pet 5 to be returned to the pet owner 10, the concerned person 45 can obtain information about the pet 5 by using a mobile device 45 configured to wirelessly receive transmitted Bluetooth beacon data from the PID assembly 30.

The system does not require the concerned person's mobile device 45 to be pair with the PID assembly 30 to retrieve the information, nor does the concerned person 40 need to log into or have an account with any system to retrieve the information. The system does not require cellular service or Wi-Fi access to collect and present the pet identification tag information. Additionally since information is stored locally, no data is required to be transmitted or received to or from a remote server.

In accordance with one embodiment, the PID assembly 30 may transmit the data stored thereon to the mobile device 45 of the concerned person 40. The concerned person 40 can receive the output data 32 from the PID assembly 30 in the form of Bluetooth Low Energy data transmissions. This output data 32 may be collected by and processed via a software app on the mobile device 45.

Figure 5:
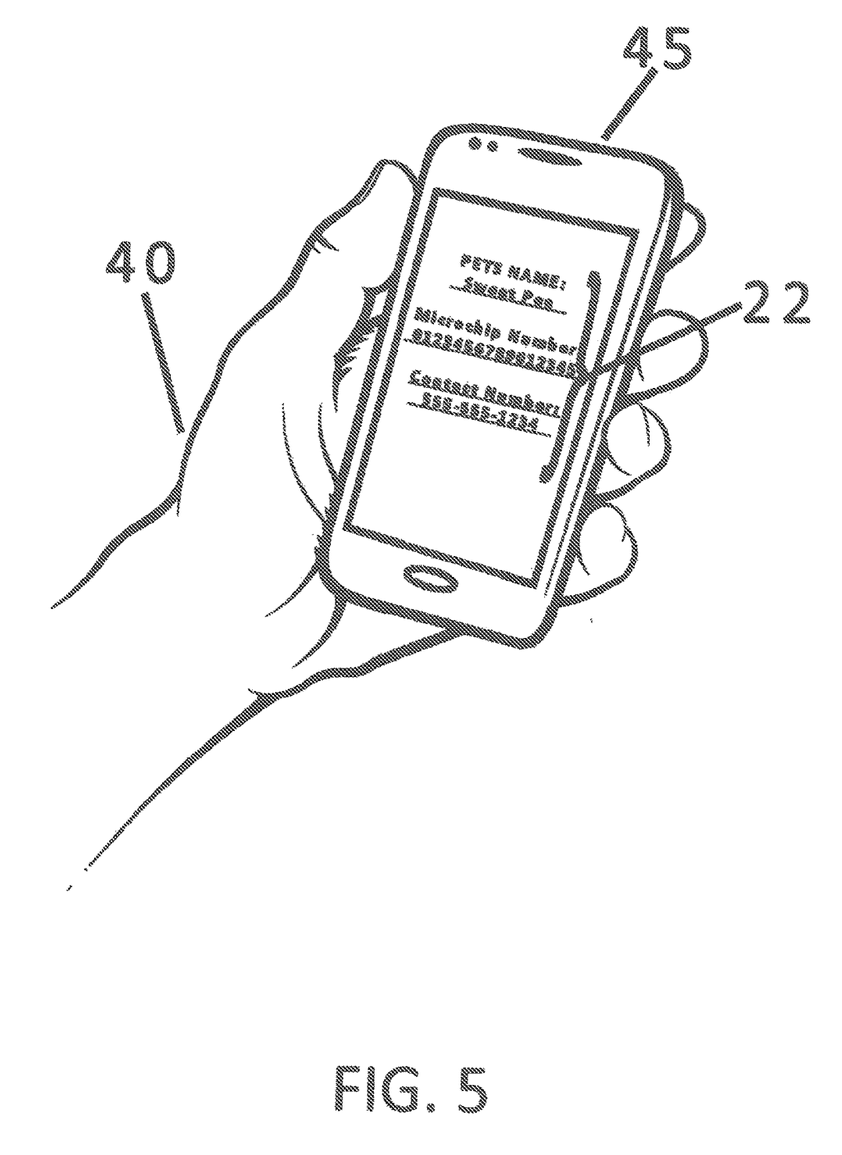
FIG. 5 is a perspective view of the third party receiving contact information output on their hand held device in accordance with one embodiment of the present invention.

Referring to FIG. 5, once the mobile device 45 of the concerned person 40 collects and processes the data, the mobile device 45 may display the contact information 22. The concerned person 40 may then use the contact information 22 accordingly, such as calling the owner or animal control authority with the contact information 22.

The advantage of utilizing the above embodiment, having a PID assembly 30 that is easily identifiable with the Bluetooth beacon function, is that anyone that locates a lost pet wearing the PID assembly 30 can easily retrieve important information and contact information about the pet without placing themselves in a potentially hazardous situation by physically touching or even getting close to the lost pet, which increases dramatically with certain pets that are fearful and/or physically injured.

Referring to FIG. 6, in accordance with one embodiment, the pet owner 10 may have to download the software application to the mobile device 15. The pet owner 10 may have to set-up an account in order to activate/use the software application. Once activated, the pet owner 10 may add a new PID assembly 30. When a pet owner 10 receives a PID assembly 30, the pet owner 10 may first activate the PID assembly 30. Activation may be done in different manners such as turning on a switch, connecting a power supply and similar methods. Once activated, the pet owner 10 may receive the Bluetooth beacon data transmission 17 containing the unique identifier and serial number from the PID 30 using the mobile device 15 which has Bluetooth capabilities and the software application. Using the software application, the pet owner 10 may enter non-confidential animal information data 50 and confidential contact information data 55 using the mobile device 15. The non-confidential animal information data 50 may include a name of the pet, description of the pet, a picture of the pet, or other non-confidential animal information.

The pet owner 10 may save and transmit the data via the mobile device 15 through a computer network, Wi-Fi, or cellular access to the system server 35 which receives and stores the data internally. The system server 35 may verify that the unique identifier and serial number from the PID assembly 30 correspond. If not, the system server 35 may send a new serial number corresponding to the unique identifier of the PID assembly 30.

Figure 7:
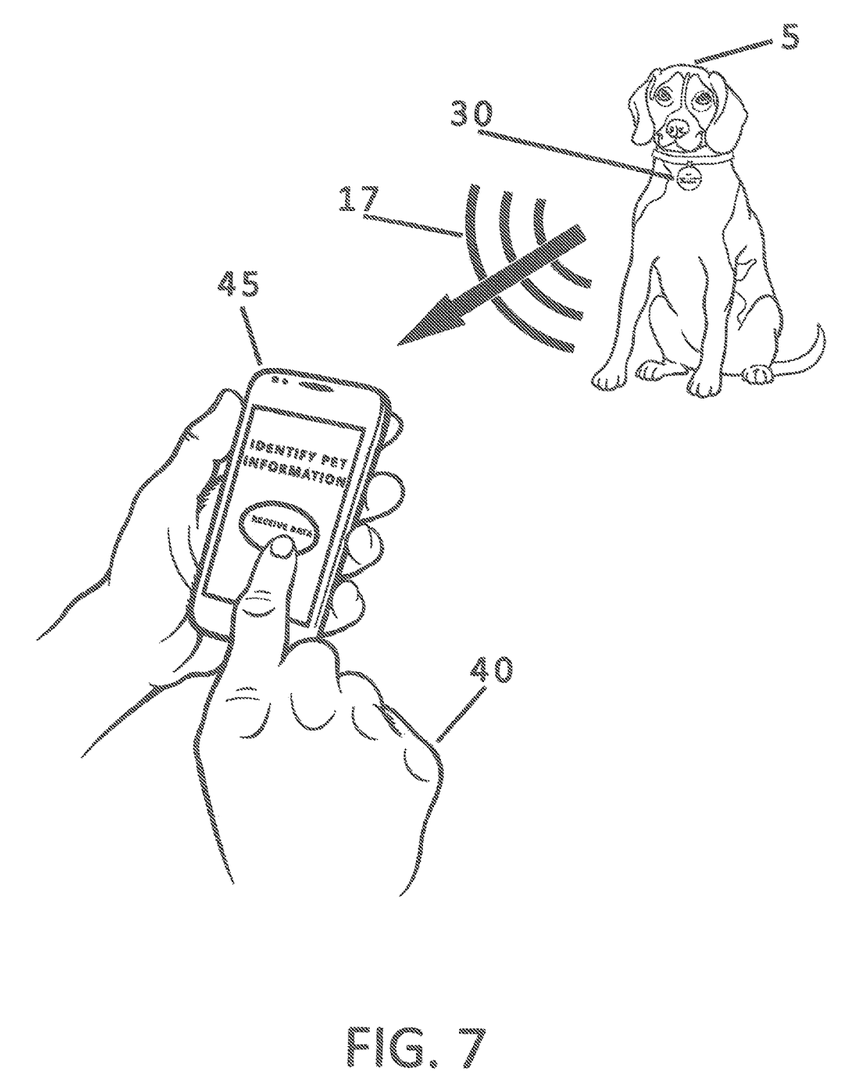
FIG. 7 is a perspective view of a lost/stray animal being identified by a third party using a mobile device with the software applications to receive the Bluetooth beacon data information transmission from the PID in accordance with one embodiment of the present invention.

Referring to FIG. 7, the PID assembly 30 may be attached to a collar of a pet 5. In accordance with one embodiment, the PID assembly may consistently send the Bluetooth beacon data transmission 17 containing the unique identifier and serial number from the PID 30. In the event the pet 5 becomes lost, a concerned person 40 using his or her mobile device 45 with the software application receives the Bluetooth beacon data transmission 17 containing the unique identifier and serial number from the PID 30. In accordance with one embodiment, the concerned person 40 may have to open the software application on the mobile device 45. The concerned person 40 may have to use an input/output (I/O) feature on the mobile device 45 to receive the Bluetooth beacon data transmission 17. The unique identification and serial number within the Bluetooth beacon data transmission 17 may be processed by the mobile device 45 using the software applications.

Figure 8:
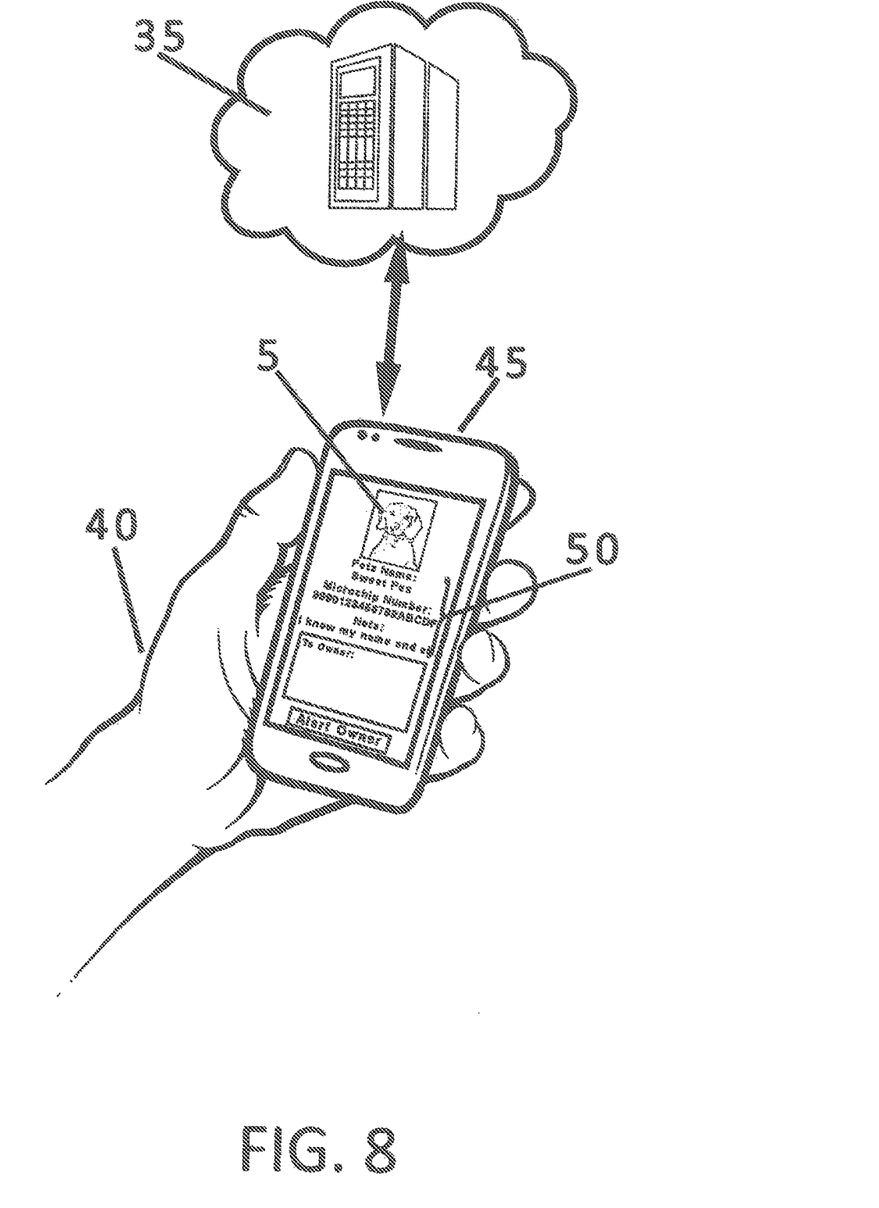
FIG. 8 is a perspective view of the third party using a mobile device with the software applications to send and receive the animal identity information with the system server and the data information output on their mobile device in accordance with one embodiment of the present invention.

Referring to FIG. 8, once the mobile device 45 has processed the data from the PID 30, the software application may then include the time, date, device identifier, and Global Positioning System location coordinates of the mobile device 45 and send this data to the system server 35 through the communication network, where the system server 35 then provides the owners non-confidential animal information data 50 about the animal 5 back to the mobile device 45 through a communication network.

The concerned person 40 can then use the owner's non-confidential animal information data 50 to alert the pet owner 10 securely of the lost pet 5. In accordance with one embodiment, the concerned person 40 may use an I/O feature on the mobile device 45 to enter and send a message to the owner of the lost pet 5. The message may include, but is not limited to a message to the pet owner 10, contact information of the concerned person 40, or other information.

Figure 9:
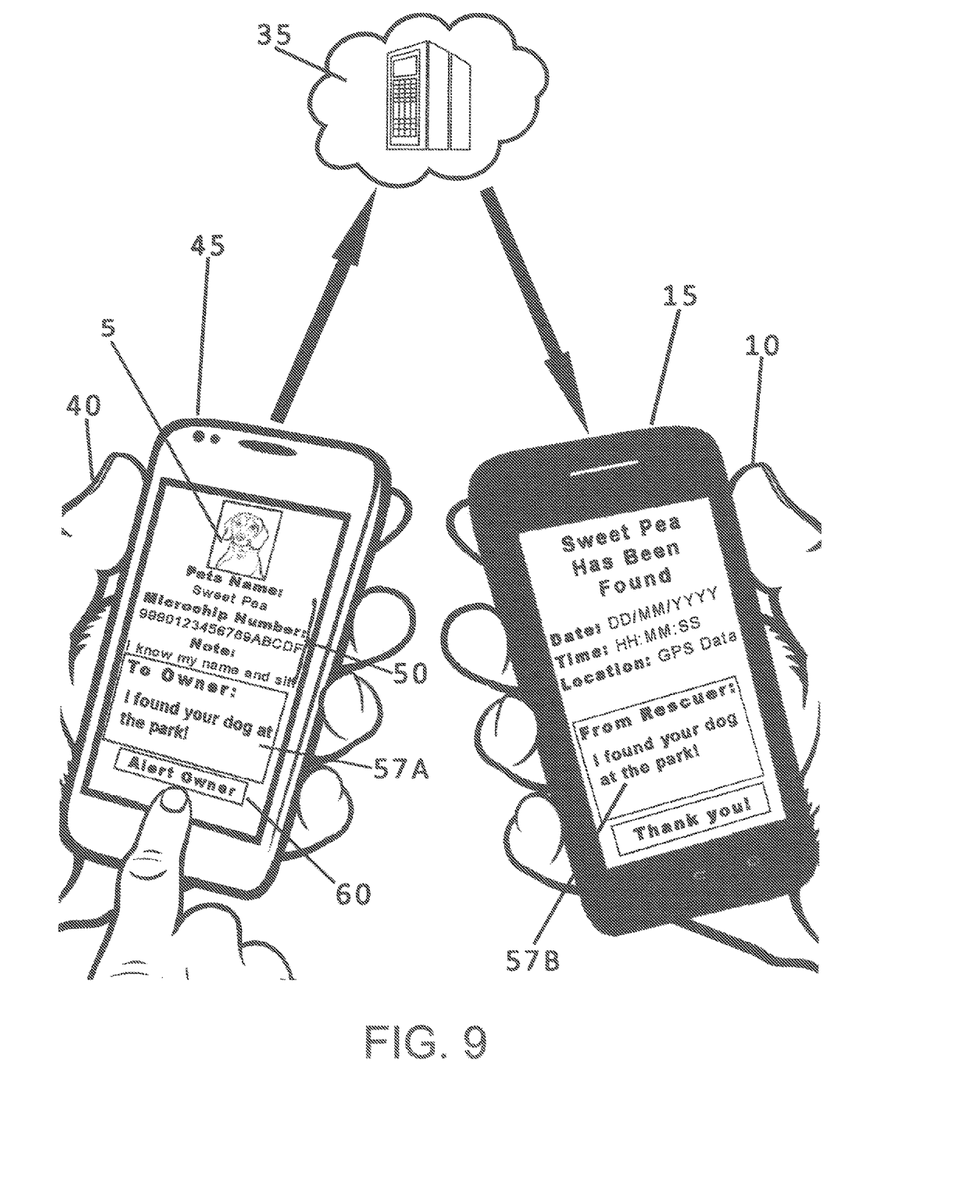
FIG. 9 is a perspective view of the third party alerting the animal's owner and providing optional information using his or her mobile device with the software applications and the designed system in accordance with one embodiment of the present invention.

Referring to FIG. 9, in accordance with one embodiment, the concerned person 40 may use the owner's non-confidential animal information data 50, to alert the pet owner 10 securely and anonymously, and to provide optional information 57A to the pet owner 10 using the software application's "Alert Owner" function 60. In accordance with one embodiment, the optional information 57A may be a message, contact information of the concerned person 40 or other information the concerned person 40 may deem relevant.

The concerned person 40 may use the mobile device 45 to send the collected data and optional information 57A to the system server 35 through a communication network. The system server 35 may relay the concerned person's alert, optional information 57A, and collected data to the mobile device 15 of the pet owner 10 alerting the pet owner 10 that the animal 5 has been located by the concerned party 40. The mobile device 15 of the pet owner 10 may displays the alert, the global positioning system coordinates, collected information, and any optional information 57B. The concerned person 40 may also contact an animal control authority with the animal's information 50. In accordance with one embodiment, communication through a communication network between the pet owner 10 and the concerned person 40 may be through Global System for Mobile communications, Wi-Fi communications, computer network communications, and/or additional IEEE standards.

Figure 10:
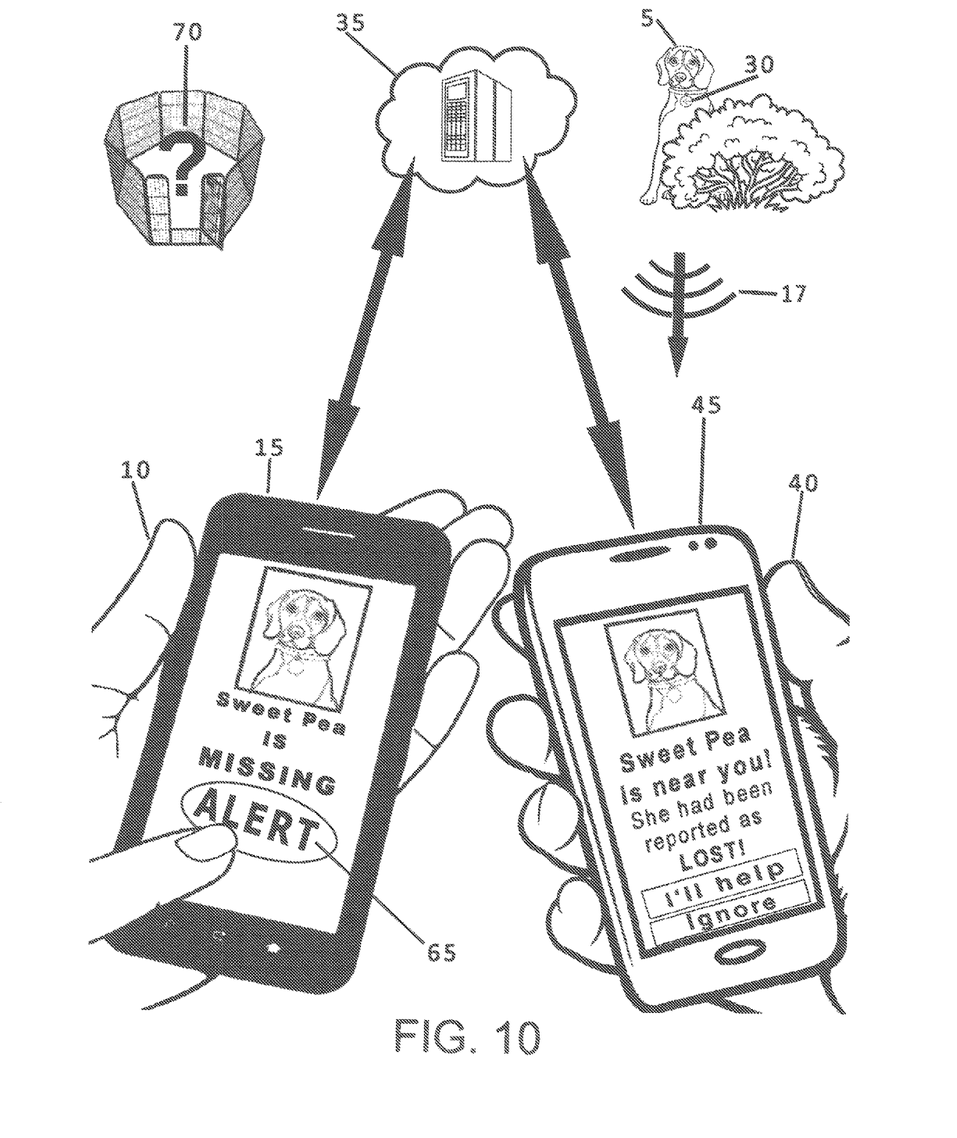
FIG. 10 is a perspective view of the owner using his or her mobile device with the software applications to alert the system server that the animal is missing, which may alert any third parties using their mobile devices with the software applications that are in close proximity to the lost/stray the animal in accordance with one embodiment of the present invention.

Referring to FIG. 10, the pet owner 10 may determine that his/her pet 5 is not where it belongs 70 and may be considered lost/stray. The pet owner 10, may log into his/her account, using the mobile device 15 with the software applications and selects an "Animal is Missing" option 65. The owner 10 using the mobile device 15 may send the lost animal alert to the system server 35 through a communication network, using a Global System for Mobile communications, Wi-Fi communications, computer network communications, and/or additional IEEE standards. In the event that a concerned person 40 comes in proximity to the lost pet 5 wearing the PID 30, the mobile device 45 of the concerned person 40 may autonomously receive and process the BLE beacon data information from the PID 30 including the time, date, device identifier, and global positioning system coordinates information of the mobile device 45 and send the data information to the system server 35 through a communication network, using a Global System for Mobile communications, Wi-Fi communications, computer network communications, and/or additional IEEE standards. The system server 35 may identify the pet 5 is marked as an alert lost/stray, and then send the alert data information using Global System for Mobile communications, Wi-Fi communications, computer network communications, and/or additional IEEE standards to the mobile device 45 of the concerned person 40. Should the concerned person 40 choose to become involved with assisting the lost/stray pet 5, the process will cycle though the examples identified above. The system server 35 may maintain that the pet 5 is considered an alert lost/stray until the pet owner's 10 changes the status of the pet. Thus, if the pet owner 10 finds the pet 5, the pet 5 is returned, or the like, the pet owner 10 may change the status of the pet. In accordance with one embodiment, the pet owner 10, using the mobile device 15 may need to be in close proximity to the pet 5 wearing the PID 30. This may allow the mobile device 15 to receive the BLE beacon data transmission 17 containing the unique identification and serial number from the PID 30. The mobile device 15 may autonomously sends the data to the system server 35 through a communication network, using Global System for Mobile communications, Wi-Fi communications, computer network communications, and/or additional IEEE standards thereby changing the status of the pet 5.

The foregoing description is illustrative of particular embodiments of the application, but is not meant to be a limitation upon the practice thereof. The following claims, including all equivalents thereof, are intended to define the scope of the application.

What is claimed is:

1. A method of identifying and assisting an animal comprising:
    transmitting a unique identification and serial number from an identification tag coupled to the animal to a first portable electronic device;
    inputting owner information from the first portable electronic device;
    transmitting the owner information inputted from the first portable electronic device to a server;
    storing the owner information on the server;
    sending a signal of a lost animal alert from the first portable electronic device to the server that the animal is lost;
    receiving the unique identification and serial number from an identification tag by a second portable electronic device;
    receiving the owner information on the second portable electronic device; and
    removing the lost animal alert from the server.

2. The method of claim 1, wherein inputting owner information from the first portable electronic device comprises transmitting the owner information from the first portable electronic device to the identification tag to program the identification tag with the owner information.

3. The method of claim 1, wherein receiving the owner information on the second portable electronic device comprises transmitting the owner information from the identification tag to the second portable electronic device.

4. The method of claim 1, comprising:
    processing the unique identification and serial number from the identification tag by the second electronic device;
    identifying a time and location when the second electronic device receives and processes the unique identification and serial number from the identification tag; and
    transmitting the time and location when the second portable electronic device receives and processes the unique identification and serial number from the identification tag to the server by the second portable electronic device.

5. The method of claim 4, comprising transmitting the owner information from the server to the second portable electronic device.

6. The method of claim 5, comprising sending an alert to the first portable electronic device that the animal has been located.

7. The method of claim 5, comprising sending an alert to the first portable electronic device that the animal has been located, wherein the alert shows a time and location of the animal.

8. The method of claim 1, wherein transmitting a unique identification and serial number from an identification tag comprises transmitting a Bluetooth beacon transmission signal containing the unique identification and serial number from the identification tag to the first portable electronic device.

9. The method of claim 1, comprising:
sending a signal of a lost animal alert from the first portable electronic device to the server that the animal is lost;
receiving the unique identification and serial number from the identification tag by the first portable electronic device when the animal is found;
transmitting the unique identification and serial number to the server by the first portable electronic device; and
removing the lost animal alert from the server.

10. The method of claim 9, comprising sending an alert to the first portable electronic device that the animal has been located.

11. The method of claim 9, comprising sending an alert to the first portable electronic device that the animal has been located, wherein the alert shows a time and location of the animal.

12. A method of identifying and assisting an animal comprising:
transmitting a Bluetooth beacon transmission signal containing a unique identification and serial number from an identification tag coupled to the animal to a first portable electronic device;
receiving the unique identification and serial number from the identification tag by the first portable electronic device;
transmitting the unique identification and serial number to the server by the first portable electronic device;
inputting owner information from the first portable electronic device;
transmitting the owner information inputted from the first portable electronic device to a server;
storing the owner information on the server;
sending a signal of a lost animal alert from the first portable electronic device to the server that the animal is lost;
receiving the unique identification and serial number from an identification tag by a second portable electronic device;
processing the unique identification and serial number from the identification tag by the second electronic device;
identifying a time and location when the second electronic device receives and processes the unique identification and serial number from the identification tag;
transmitting the time and location when the second portable electronic device receives and processes the unique identification and serial number from the identification tag to the server by the second portable electronic device;
receiving the owner information on the second portable electronic device from the server; and
removing the lost animal alert from the server.

\* \* \* \* \*